Sept. 7, 1965  J. F. GALLO  3,204,273
DRINKING GLASS WASHING MACHINE
Filed Dec. 4, 1963  2 Sheets-Sheet 1
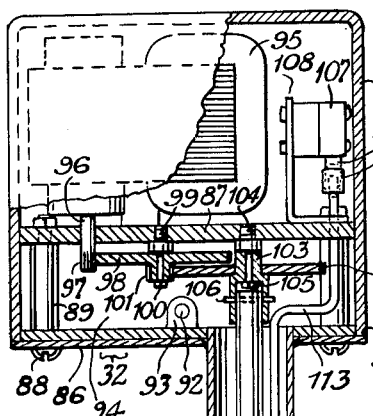
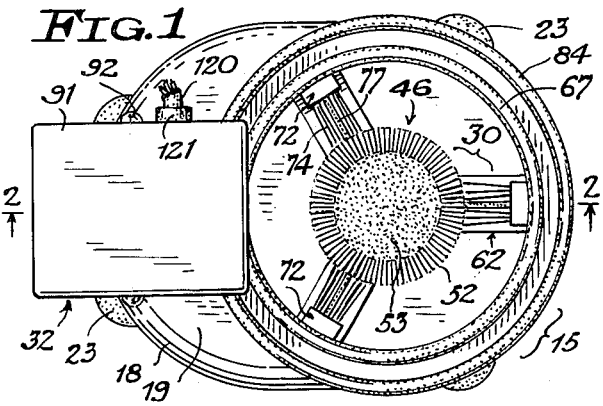
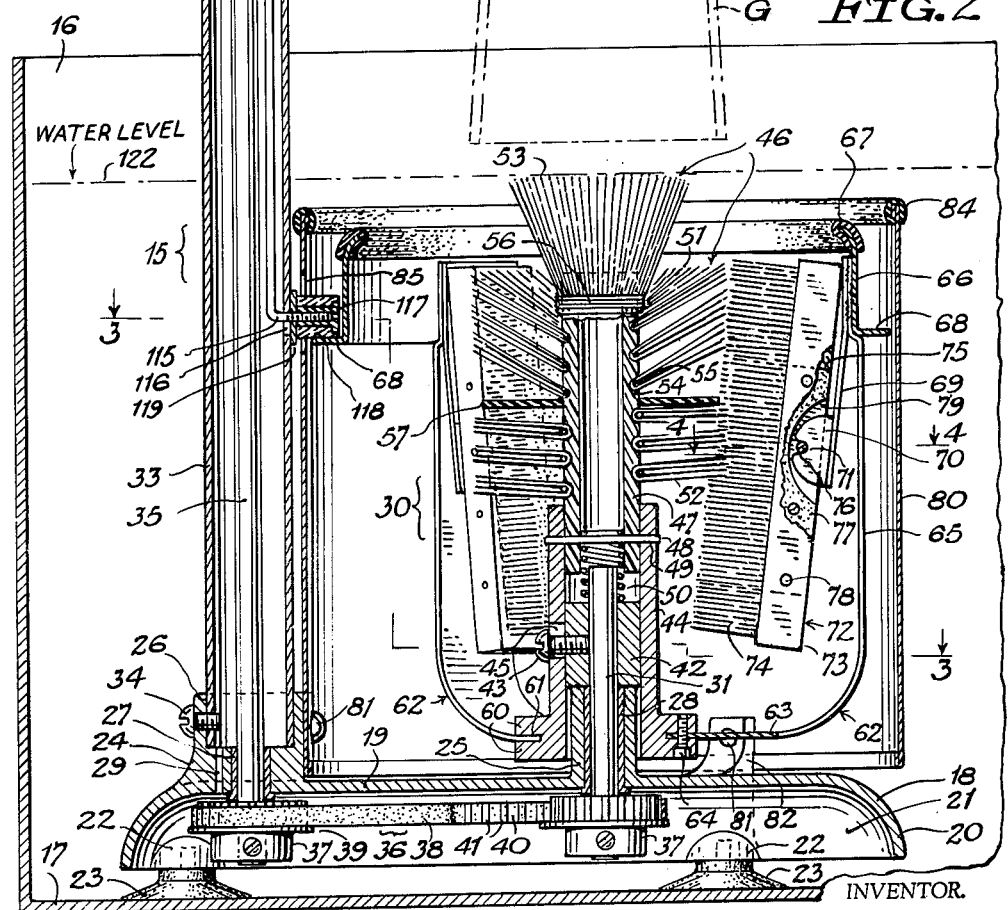
INVENTOR.
JOHN F. GALLO
BY
Christopher L. Waal
ATTORNEY Sept. 7, 1965  J. F. GALLO  3,204,273
DRINKING GLASS WASHING MACHINE
Filed Dec. 4, 1963  2 Sheets-Sheet 2
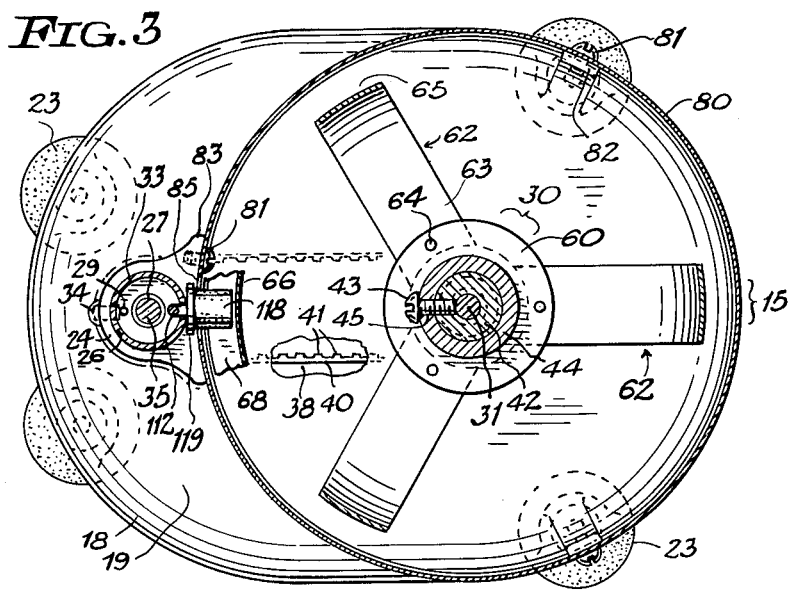
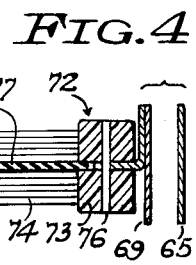
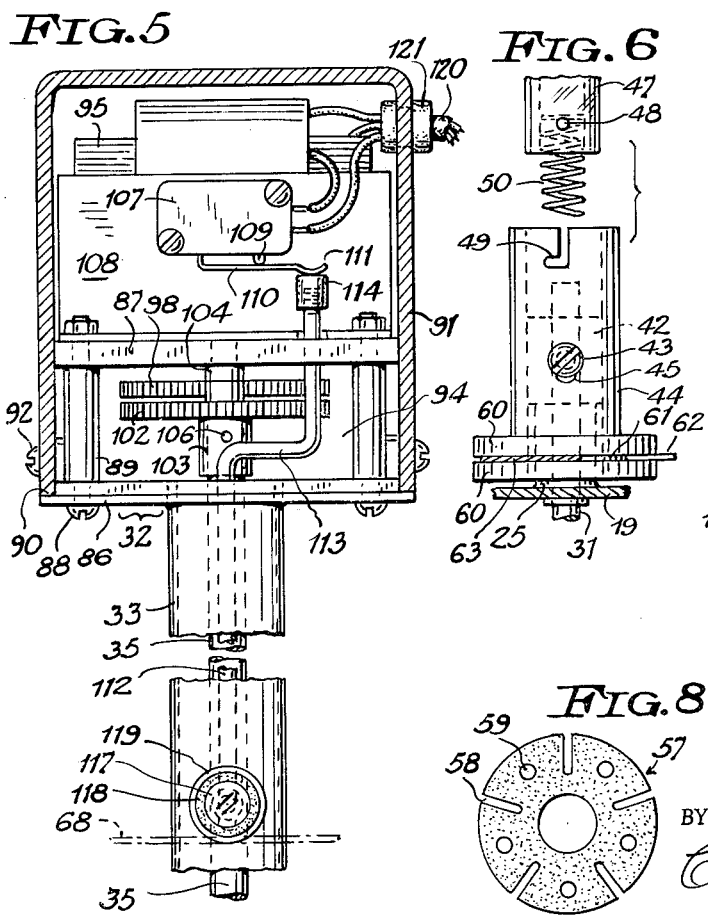
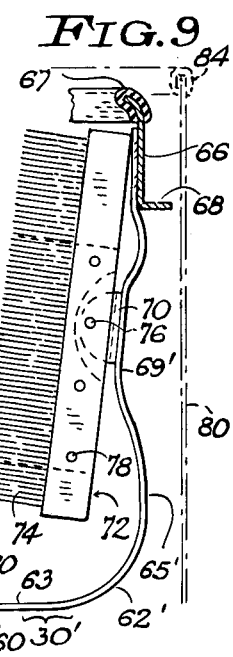
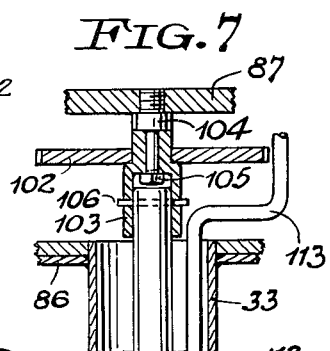
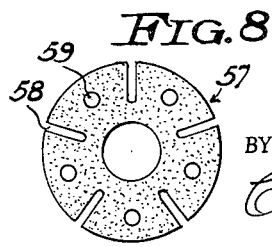
INVENTOR.
JOHN F. GALLO
BY
Christopher L. Waal
ATTORNEY

United States Patent Office 3,204,273
Patented Sept. 7, 1965

3,204,273
DRINKING GLASS WASHING MACHINE
John F. Gallo, 3530 19th Ave., Kenosha, Wis.
Filed Dec. 4, 1963, Ser. No. 327,964
4 Claims. (Cl. 15—76)

This invention relates to glass washers adapted for use in cleaning drinking glasses and similar receptacles.

A type of portable glass washer heretofore devised for use in restaurants, soda fountains, and taverns is arranged to be removably rested in a wash sink or tank and includes rotary scrubbing or brushing means to which an inverted drinking glass or other receptacle is manually applied to effect a cleaning operation. In one form of glass washer, the scrubbing means is driven by an electric motor.

An object of the invention is to provide an improved motor-driven glass washer of this general type including a belt drive permitting exposure thereof to the liquid in the sink, so as to obviate the need for a sealed drive housing, the drive also being quiet in operation and avoiding the need for belt take-up means.

Another object is to provide a motor-driven glass washer including simple and reliable actuating means for a motor control switch, actuation of the switch being automatically effected by application and removal of a glass with respect to the scrubbing means.

Still another object is to provide a glass washer including improved rotary scrubbing or brushing means.

A further object is to simplify manufacture and to perfect details of construction generally.

The invention further consists in the several features hereinafter described and claimed.

In the accompanying drawings:

FIG. 1 is a top view of a glass washer constructed in accordance with the invention;

FIG. 2 is an enlarged sectional elevational view of the glass washer, taken generally on the line 2—2 of FIG. 1;

FIG. 3 is a horizontal sectional view taken generally on the line 3—3 of FIG. 2;

FIG. 4 is a detail transverse sectional view of an outside brush and its mounting, taken generally on the line 4—4 of FIG. 2;

FIG. 5 is a fragmentary detail elevational view of a driving motor unit and its control switch means, parts being shown in section;

FIG. 6 is a fragmentary detail elevational view of brush driving parts with an axial brush core in disconnected condition, parts being shown in section;

FIG. 7 is a fragmentary vertitcal sectional view of a motor unit gear housing and drive shaft connection;

FIG. 8 is a detail plan view of a rubber squeegee disk for an inner or central brush, and FIG. 9 is a fragmentary vertical sectional view of a modified form of outside brush mounting.

In the drawings, the numeral 15 designates generally a glass washer embodying the invention. The washer is here shown to be of portable self-contained construction and is adapted to be removably mounted in an existing wash sink or basin 16 having a horizontal bottom wall 17.

The washer includes a base 18 of generally elliptical shape having a horizontal top wall 19 and a rounded, downturned marginal flange 20, the base forming therebelow an open-bottom chamber 21. The base is desirably in the form of a casting of a corrosion-resistant non-ferrous metal. Lugs or embossments 22 are integrally formed at the inner side of the marginal flange 20 flush with the lower edge of the flange and have secured thereto rubber suction cups 23 adapted to rest on the bottom wall of the sink, thus firmly supporting the base.

Spaced along the major axis of the base and upstanding from the top wall of the base are tubular vertical bearing bosses 24 and 25, the former being disposed near an end of the base and having an upwardly opening socket 26. The bearing bosses 24 and 25 are here shown to be provided with respective bearing bushings 27 and 28, and the boss 24 is also provided with a drain opening 29 extending from the socket 26.

A rotary brushing or scrubbing unit 30, hereinafter more fully described, is mounted on the base and includes a vertical shaft 31, such as of stainless steel, journalled in the bushing 28, the lower end of the shaft extending into the base chamber 21. Driving means for the brushing unit includes a motor unit 32, hereinafter more fully described, supported in elevated position on the upper end of a tubular column or post 33, the lower end of which is rigidly secured, as by one or more screws 34, in the socket 26 of the base boss 24. The driving means further includes a vertical driving shaft 35, such as of stainless steel, extending downwardly from a driving connection with the motor unit through the hollow post and into the hollow base, the shaft being disposed coaxially in the post and being journalled in the bushing 27. A belt drive 36 connects the lower ends of the driving shaft 35 and brush shaft 31 and is housed in the hollow base. The belt drive comprises hubbed sprocket pulleys 37 which are fixed to the lower ends of the driving shaft 35 and brush shaft 31 within the base chamber 21, and are drivingly connected by a positive drive rubber belt 38, each pulley having a belt-supporting disk or flange 39. The belt, which is of a conventional type per se, comprises a reinforced non-extensible band 40 carrying shallow teeth 41 meshing with the toothed sprocket pulleys to transmit power from the driving shaft to the brush shaft. The belt drive is relatively quiet in operation and can safely be exposed to the liquid in the sink or basin, thus avoiding the need for a sealed lubricant chamber. Also, the positive drive belt obviates the need for belt-tightening or adjustment.

The rotary brushing unit or assembly 30 includes a cylindrical collar 42 which is fixedly secured on the upper portion of the brush shaft 31 by a radial screw 43 and rests on the upper end of the bearing boss 25 to confine the shaft against axial displacement. The brushing unit further includes a cylindrical sleeve 44 which slidably fits on the rotatable collar 42 and has a short vertical slot 45 through which the screw 43 passes, thus serving to drive the sleeve while permitting a limited axial movement of the sleeve. A central brush 46 for cleaning the inside of a drinking glass G is carried and driven by the sleeve and includes a vertical tubular brush core 47, such as of nylon, having its lower end fitting in the upper end of the sleeve 44 and detachably secured therein by a cross pin 48. The ends of the cross pin are detachably engaged in diametrically opposite bayonet slots 49 formed in the upper end portion of the sleeve, FIGS. 2 and 6, thus not only securing the brush core to the sleeve but also providing a driving connection between the sleeve and the brush core. A compressed coil spring 50 is axially disposed in the lower end of the tubular brush core and has its upper end anchored on the cross pin 48. The lower end portion of the spring surrounds the upper end portion of the brush shaft 31 and bears on the upper end face of the collar 42, thus urging the sleeve and connected brush core upwardly, the upward travel being limited by the abutment of the collar screw 43 with the lower end of the vertical slot 45 in the sleeve.

The central brush 46 includes upper and lower sets or groups of bristle tufts 51 and 52 projecting laterally outwardly from the side of the tubular brush core and an upwardly divergent bristle tuft 53 projecting from the top of the brush core. The side bristle tufts include folded bristles having their doubled portions disposed in helical grooves 54 formed in the exterior of the brush core and anchored therein by wrapped retaining wires 55. The bristles in the lower group extend substantially radially, while the bristles in the upper group preferably extend angularly upwardly, the core grooves being formed accordingly. The top bristle tuft 53 is suitably anchored as by a wrapping wire 56. A rubber squeegee disk 57 is carried on the brush core between the upper and lower groups of side bristle tufts and is provided with radial slots 58 and openings 59, as seen in FIG. 8.

The lower end of the rotary brush sleeve 44 is provided with a pair of slightly resilient upper and lower annular peripheral flanges 60 forming between them a narrow annular groove or slot 61. A plurality of resilient sheet metal brackets 62 of angle shape, three equi-angularly spaced brackets being shown, have lower horizontal inwardly projecting ends 63 seated in the groove or slot 61 and clamped between the spaced sleeve flanges 60 by screws 64. The brackets 62, which are formed of resilient stainless steel band stock, include upstanding arms 65 the upper ends of which are rigidly secured to the inner side of a sheet metal shroud ring or top ring 66, as by welding or riveting, the ring being coaxial with the brush shaft 31. The shroud ring has an inwardly curved upper edge receiving a peripherally slotted soft rubber guard ring 67. At its lower edge the shroud ring 66 is provided with an outwardly projecting annular flange 68 which forms part of a motor switch actuating means hereinafter described. Leaf spring arms 69, such as of stainless steel, are secured at their upper ends to the inner sides of the respective brackets 62 at the shroud ring, as by welding. The free lower ends of the spring arms 69 are angled inwardly and are provided with respective inwardly projecting ears 70 disposed in radial vertical planes, each ear having a radially inwardly opening slot or notch 71. The spring arms 69 pivotally carry respective outside cleaning brushes 72 each comprising a bar-like brush back 73, such as of molded nylon, carrying bristles 74 projecting toward the vertical axis of the rotary brush unit. Each brush back has a central guide slot 75 therethrough extending longitudinally of the back and receiving the corresponding ear 70. A cross pin 76 in the brush back extends across the slot 75 and is received in the ear notch 71. Each brush back is thus confined to swing in a vertical radial plane. A soft rubber squeegee strip 77 is anchored in the brush back slot, as by cross pins 78, and its projectiong edge portion is flanked at opposite sides by the bristles 74. The outer edge portion of the squeegee strip has a notch 79 to clear the pivot ear 70.

An upright cylindrical outer casing or shield 80, such as of stainless steel, concentrically surrounds the rotary brushing unit and is here shown to have doubled upper and lower edges. The lower edge portion of the casing is secured to the hollow base 18 by screws 81, two of these screws engaging lugs 82 upstanding from the marginal portion of the base, while a third screw engages a lug portion 83, FIG. 3, of the upstanding base boss 24. The upper edge of the outer casing projects a short distance above the shroud ring 66 of the rotary brush unit and is enclosed by a soft rubber guard ring 84. The top bristle tuft 53 of the rotary inside brush projects a short distance above the plane of the rubber guard ring 84. Near the hollow post 33 the outer casing 80 has an opening 85 to clear parts of switch actuating means hereinafter described.

The elevated motor unit 32 includes a frame comprising a two-ply horizontal base plate 86 and a motor-supporting plate 87 spaced thereabove, these plates being of rectangular shape and being secured together by screws 88 and associated spacer sleeves 89. The base plate 86 is rigidly secured to the upper end of the hollow post 33, as by welding, and has a marginal rabbet 90 forming a seat for the lower edge of a detachable cover or housing 91, the latter being secured by screws 92 engaging the lugs 93 on the base plate. The space between the plates 86 and 87 forms a gear chamber 94. An electric motor 95, such as an induction motor, is mounted on the supporting plate 87 and is enclosed in the housing 91. The motor includes a vertical rotor shaft 96 projecting downwardly through the plate 87 and formed with a pinion 97 within the gear chamber. A reduction gearing is disposed in the gear chamber and includes a gear 98 meshing with the motor shaft pinion and rotatably supported by a shouldered vertical screw stud 99 the upper end of which is threaded into the underside of the plate 87, and the lower end of which carries a nut 100. At its lower side the gear 98 carries a pinion 101 which meshes with a gear 102 secured to a tubular coupling member 103 best seen in FIGS. 2 and 7, rotatably mounted on a second vertical screw stud 104 threaded into the lower side of the plate 87, the stud being provided with a retaining nut 105 for the coupling member. The upper end of the driving shaft 35 extends into the lower end of the coupling member and is secured therein by a cross pin 106, thus supporting the shaft and providing a driving connection.

A motor switch 107, actuated as hereinafter described, is monuted on an angle bracket 108 secured to the upper face of the motor-supporting plate 87, as by some of the screws 88, and is desirably of a normally-closed micro-switch type spring-urged to closed position and having the usual projecting switch plunger 109 displaced upwardly or inwardly to switch-opening position by a resiliently mounted lever 110 provided with a rounded free end 111. A switch actuating rod 112 extends longitudinally within the hollow post 33 and has a laterally offset upper end portion 113 on the upper extremity of which is threaded an insulating button 114, such as of nylon, engageable with the underside of the rounded end 111 of the switch lever 110. The switch actuating rod has a laterally bent lower end 115 which extends through a short vertical slot 116 in the hollow post 33 and is threaded to receive a headed sleeve nut 117 which carriers therein a nylon roller 118, there being a washer 119 on the rod end between the roller and the outer wall of the post. The roller 118 rides on the upper surface of the peripheral flange 68 of the brush unit shroud ring. The rotary brush unit is normally upwardly urged by the coil spring 50, thus lifting the switch actuating rod to hold the motor switch in its open condition when the glass washer is not active. The motor current is supplied through a power cord 120 passing through an insulating grommet 121 in the motor housing 91, the cord being connected in series with the switch. The cord is preferably of a type including a grounding wire, and the outer end of the three-wire cord is connected to a conventional grounding-type plug, not shown.

In use, the glass washer is detachably set in the wash sink or basin 16 in which water, or detergent solution, or sterilizing solution, is maintained at a suitable level 122, the motor and control switch of the washer being disposed well above the liquid level. The glass G to be washed is held in inverted position by the user's hand grasping the bottom portion of the glass, and is passed downwardly over the central or inside brush 46, the bristles of which engage the inner side walls and interior bottom wall of the glass, and the resilient, deflectable squeegee disk of which has a passing rubbing engagement with the rim portion of the glass. The pivoted outside brushes 72 are forced apart by the downwardly displaced glass and the bristles and squeegee strips thereof conformably engage the outer walls of the glass. Downward manual pressure on the hand-held glass as it is urged downwardly on the central brush depresses this brush a short distance, for example 1/16" to 3/16" against the action of the coil spring 50, thus permitting the switch actuating rod 112 to descend the same distance, and allowing the switch to assume its normally closed position, whereupon the motor will start in operation. The motor drives the rotary brush assembly at a suitable speed, for example 70 to 100 r.p.m., through the positive drive toothed belt 38, causing the brushes to clean the interior and exterior walls of the glass while the glass is manually held against rotation. The rubber squeegee disk 57 on the central brush and the squeegee strips 77 on the outside brushes assist in cleaning the rim of the glass. During rotation of the brush assembly the nylon roller 118 rides on the shroud ring flange 68. The cleaned drinking glass is then lifted off the brush assembly, causing the inside brush to rise under urge of the spring 50, so that the switch actuating rod will be lifted by the shroud ring flange 68 to open the motor switch, thus automatically stopping the motor.

In the modified form of brush assembly shown in FIG. 9, the rotary brushing unit 30' includes angle brackets 62' of spring metal band stock, one being shown, connecting the flanged rotary sleeve 44 with the shroud ring 66. In place of the spring arm 69 of FIG. 2, the upstanding portion 65' of each angle bracket includes an intermediate inwardly offset resilient portion 69' to which is attached the brush-mounting ear 70 pivotally carrying the outside brush 72. The brush assembly of FIG. 9 is otherwise the same as that of FIG. 2.

The term "rubber" as herein used includes rubber-like material.

I claim:

1. A glass washer comprising a base, a hollow post upstanding from said base, an electric motor and control switch therefor carried by the upper portion of said post, a driving shaft extending longitudinally in said post and rotatable by said motor, a driven shaft rotatably carried by said base in spaced parallel relation to said driving shaft, means drivingly connecting the lower end portions of said driving and driven shafts, rotary glass-brushing means projecting above said base and including a central brush rotated by said driven shaft, said brush having a limited axial displacement, resilient means normally urging said central brush upwardly, and actuating means for said motor control switch having a portion disposed in said hollow post and shiftable to switch-closing position in response to depression of said central brush by an inverted glass passed downwardly over said brush.

2. A glass washer comprising a base, a rotor rotatably carried by said base and projecting upwardly therefrom, an upwardly projecting central brush carried by said rotor and adapted to be engaged by an inverted glass passed downwardly thereon, said rotor and its central brush having a limited axial displacement, resilient means normally urging said rotor and its central brush upwardly, a hollow post upstanding from said base, a motor and control switch therefor carried by the upper portion of said post, transmission means drivingly connecting said motor and rotor and including a shaft in said post, and actuating means for said motor control switch including a rod shiftable in said post and having a part projecting laterally from said post, and an abutment flange on said axially displaceable rotor engaging said projecting rod part for closing said motor control switch upon depression of said central brush by the inverted glass.

3. A glass washer comprising a base, rotary glass-brushing means carried by said base and including a rotatable central brush adapted to engage the inner walls of an inverted glass passed thereover and further including a radially displaceable outer brush adapted to engage the outer walls of the inverted glass, said outer brush including a brush back with inwardly projecting bristles and with a guide slot formed therein at its outer side extending longitudinally of said back in a substantially radial plane, a radially resilient support for said outer brush including an ear slidably fitting in said guide slot, and a cross pin in said brush back having a pivotal engagement with said ear to permit rocking of said resiliently supported outer brush.

4. A glass washer comprising a base, a rotor rotatably carried by said base and projecting upwardly therefrom, an upwardly projecting central brush carried by said rotor and adapted to have an inverted glass passed downwardly thereover, said rotor including a ring member concentrically surrounding the upper portion of said central brush and resilient supporting means connecting said ring member with the lower portion of said rotor, a resilient arm secured at its upper end to said ring member and projecting downwardly therefrom, and a radially yieldable outer brush at the inner side of said resilient arm secured to the lower end of said arm and having bristles adapted to engage the outer walls of the inverted glass.

References Cited by the Examiner

UNITED STATES PATENTS

| | | | |
|---|---|---|---|
| 1,706,302 | 3/29 | Leavy | 15—75 |
| 1,795,671 | 3/31 | Ott et al. | 15—56 |
| 2,032,915 | 3/36 | Cunningham | 15—75 |
| 2,032,916 | 3/36 | Cunningham | 15—76 |
| 2,158,904 | 5/39 | Meeket et al. | 15—76 |
| 2,263,807 | 11/41 | Hanson | 15—75 |
| 2,674,896 | 4/54 | Arones | 15—49 X |
| 2,869,794 | 1/59 | Modrey | 15—75 X |
| 3,032,794 | 5/62 | Stevens | 15—36 |
| 3,044,092 | 7/62 | Fox et al. | 15—75 |

CHARLES A. WILLMUTH, *Primary Examiner.*